(No Model.)
L. H. GOFF.
DEVICE FOR LIFTING KETTLES.
No. 319,226. Patented June 2, 1885.
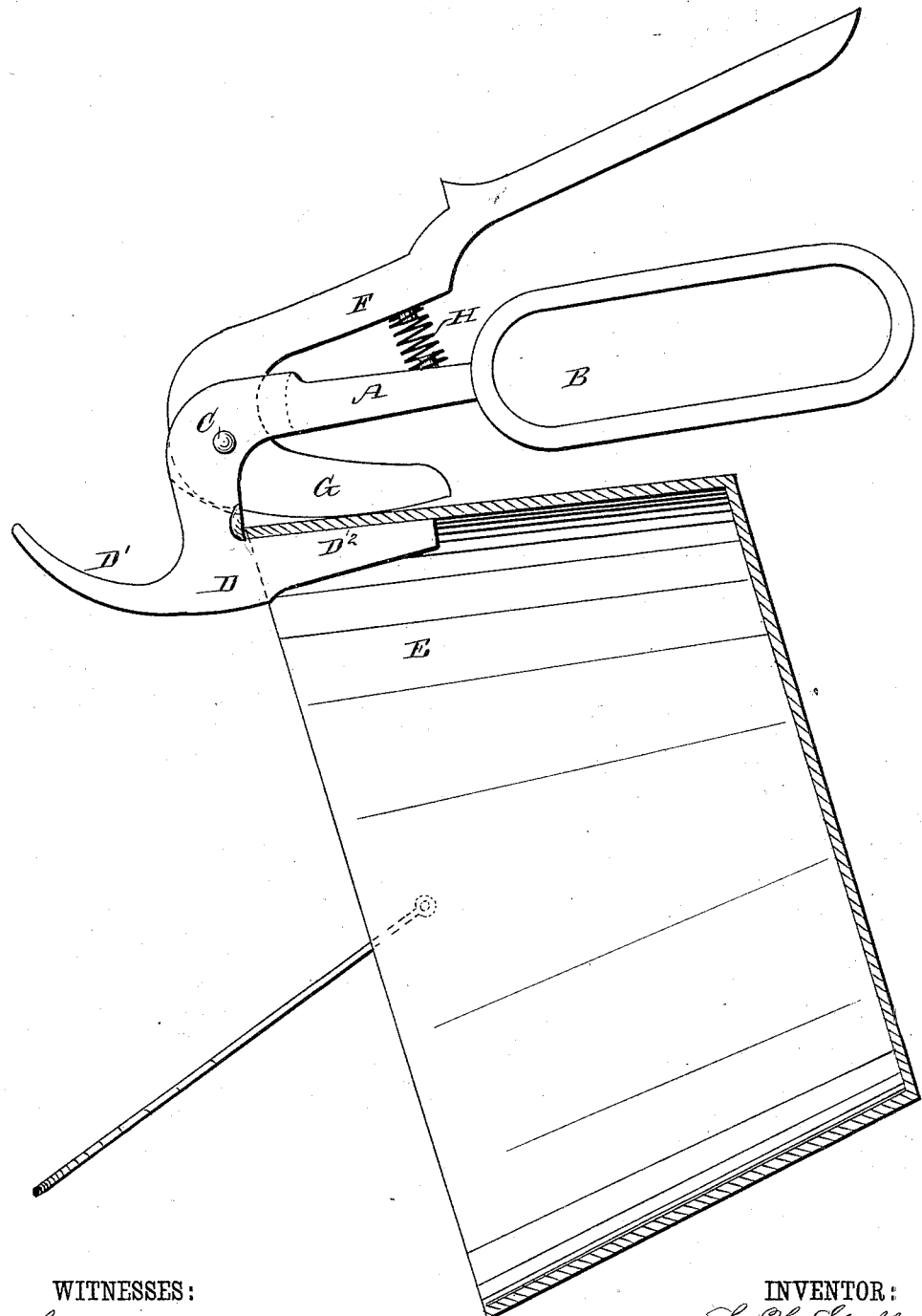
WITNESSES:
INVENTOR:
L. H. Goff
BY Munn & Co.
ATTORNEYS.

United States Patent Office.

LUCIUS H. GOFF, OF RICHFORD, VERMONT.

DEVICE FOR LIFTING KETTLES.

SPECIFICATION forming part of Letters Patent No. 319,226, dated June 2, 1885.

Application filed September 11, 1884. (No model.)

*To all whom it may concern:*

Be it known that I, LUCIUS H. GOFF, of Richford, in the county of Franklin and State of Vermont, have invented a new and Improved Device for Lifting and otherwise Handling Kettles, of which the following is a full, clear, and exact description.

The object of my invention is to provide a new and improved device to facilitate lifting, carrying, tilting, and otherwise handling kettles, &c.

The invention consists in the construction and arrangement of parts, as will be hereinafter fully described and claimed.

The kettle is grasped between the head and prong, and is thus held securely.

Reference is to be had to the accompanying drawing, forming a part of this specification, in which a side view of my improved device for lifting and otherwise handling kettles, &c., is shown.

A lever, A, is provided at one end with an elongated handle-loop, B, and the opposite or upper end is bent at right angles at C, and terminates in a head, D, parallel with the lever, the upper prong, D', of the head being slightly curved, and the inner surface of the downwardly-projecting prong being straight, so as to fit well and snugly against the inner side of the kettle E.

At the bend C a lever, F, is pivoted to the lever A at the side of the same; or the lever F can pass through a longitudinal slot in the lever A, as shown in dotted lines.

The lever F is provided at its upper end with a downwardly-projecting prong, G, the outer edge of which is rounded.

A spring, H, interposed between the levers A and F, presses them from each other, thus pressing the prongs G and $D^2$ from each other to facilitate passing the upper part of the kettle, pan, or dish, E, between them.

The fingers are passed through the loop B, and the lever F pressed toward the loop B by the hand, whereby the jaws or prongs G $D^2$ are pressed against the kettle, dish, &c., which is thus grasped and held securely, and can be lifted, tilted, carried, &c.

The curved prong D' can be used as a stove-cover lifter.

Having thus described my invention, I claim as new and desire to secure by Letters Patent—

1. In a kettle-lifter, the combination, with the lever A, having a hand-loop, B, at one end, bent at right angles at its opposite end, and there provided with a head, D, parallel with the lever, and formed with a flat prong, $D^2$, and a curved prong, D', of the lever F, having a downward-projecting prong, G, the said levers being pivoted together at their bends, as shown, substantially as set forth.

2. A kettle-lifter consisting in the lever A, having a hand-loop, B, at one end, bent at right angles at its opposite end, and there formed with a head, D, parallel with the lever, and formed with downward-projecting flat prong $D^2$ and upward-projecting curved prong D', the lever F, curved downward at its outer end to form the prong G, and pivoted at its bend c to the bent part C of lever A, and the spring H, interposed between the said levers, substantially as set forth.

LUCIUS H. GOFF.

Witnesses:
JOHN H. CARPENTER,
SILAS P. CARPENTER.